United States Patent
Iftime et al.

(10) Patent No.: US 10,138,317 B2
(45) Date of Patent: Nov. 27, 2018

(54) METHOD FOR PRODUCING MECHANICALLY ROBUST LINKED PARTICLE NETWORKS

(71) Applicant: PALO ALTO RESEARCH CENTER INCORPORATED, Palo Alto, CA (US)

(72) Inventors: Gabriel Iftime, Dublin, CA (US); John Steven Paschkewitz, McLean, VA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 30 days.

(21) Appl. No.: 15/605,433

(22) Filed: May 25, 2017

(65) Prior Publication Data

US 2017/0260313 A1    Sep. 14, 2017

Related U.S. Application Data

(62) Division of application No. 14/840,913, filed on Aug. 31, 2015, now Pat. No. 9,718,914.

(51) Int. Cl.

| | | |
|---|---|---|
| *C08F 292/00* | (2006.01) | |
| *C01B 13/14* | (2006.01) | |
| *C09C 1/44* | (2006.01) | |
| *C09C 3/08* | (2006.01) | |
| *C08K 7/00* | (2006.01) | |
| *C08G 59/00* | (2006.01) | |
| *C08K 9/08* | (2006.01) | |
| *C08G 69/00* | (2006.01) | |

(Continued)

(52) U.S. Cl.
CPC .......... *C08F 292/00* (2013.01); *C01B 13/145* (2013.01); *C08G 59/00* (2013.01); *C08G 69/00* (2013.01); *C08G 69/02* (2013.01); *C08G 71/02* (2013.01); *C08G 83/001* (2013.01); *C08K 7/00* (2013.01); *C08K 9/08* (2013.01); *C09C 1/44* (2013.01); *C09C 3/08* (2013.01)

(58) Field of Classification Search
CPC ....... C08F 292/00; C01B 13/145; C09C 1/44; C09C 3/08; C09K 7/00; C09K 9/08; C08G 59/00; C08G 69/00; C08G 69/02; C08G 71/02; C08G 83/001
USPC ......................................... 526/328
See application file for complete search history.

(56) References Cited

U.S. PATENT DOCUMENTS

| | | | |
|---|---|---|---|
| 9,718,914 B2 * | 8/2017 | Iftime | C08G 83/001 |
| 2015/0086881 A1 * | 3/2015 | Zhamu | H01G 11/68 |
| | | | 429/405 |
| 2017/0058070 A1 | 3/2017 | Iftime et al. | |

FOREIGN PATENT DOCUMENTS

| | | | |
|---|---|---|---|
| WO | 03059993 A1 | 7/2003 | |
| WO | WO-03059993 A1 * | 7/2003 | C08K 9/04 |

* cited by examiner

*Primary Examiner* — Michael Bernshteyn
(74) *Attorney, Agent, or Firm* — Miller Nash Graham & Dunn LLP

(57) ABSTRACT

A method of forming lightweight structures from particle networks includes functionalizing edges of particles of an anisotropic material, exfoliating of the particles to form sheets of the material, aligning the sheets of material to form a network of multi-layered and aligned particles, and forming a structure out of the network of particles. One example uses graphite powder mixed into 4-aminobenzoic acid for edge functionalization, and exfoliation occurs with sonication in a solvent. The resulting particles undergo alignment with an aligning nozzle that also dispenses the aligned particles to form a structure.

13 Claims, 9 Drawing Sheets

FREE DISPERSED PARTICLES IN POLYMER

LINKED PARTICLES AS MONOMER UNITS

(51) Int. Cl.
*C08G 69/02* (2006.01)
*C08G 71/02* (2006.01)
*C08G 83/00* (2006.01)

MULTI-PARTICLE NETWORKS

METHOD FOR PRODUCING MECHANICALLY ROBUST LINKED PARTICLE NETWORKS

CROSS REFERENCE TO RELATED APPLICATION

This application is a divisional of and claims priority to U.S. patent application Ser. No. 14/840,913 filed Aug. 31, 2015, now U.S. Pat. No. 9,718,914, which is incorporated herein by reference.

TECHNICAL FIELD

This disclosure relates to composite materials, more particularly to materials made up of chemically linked and aligned particles.

BACKGROUND

Manufacturing lightweight parts such as those used in automotive and aerospace industries require strong polymer composites. The current state of the art involves prepreg long reinforcing fibers embedded into polymer matrices. The term 'prepreg' typically refers to fabric reinforcement that has been pre-impregnated with a resin system. The resin system generally consists of an epoxy that already includes the proper curing agent. Woven carbon fibers and fiberglass fabrics are the materials of choice in the prepreg industry. These materials enable structures with unrivaled mechanical properties, but have many difficulties in fabrication, include being time consuming and somewhat limited in that they can only be made in flat, layered shapes.

In contrast, inexpensive mixing equipment can create composite structures made by mixing and dispersing particle fillers into polymers, which in turn can form any desired shape. However, these particle polymer composite materials cannot achieve the mechanical properties required by the aerospace industry. A great need exists for particle based polymeric structures with mechanical properties approaching those of the prepreg long fiber structures.

SUMMARY

An embodiment comprises a method including functionalizing edges of particles of an anisotropic material, exfoliating of the particles to form sheets of the material, aligning the sheets of material to form a network of multi-layered and aligned particles, and forming a structure out of the network of particles.

An embodiment comprises a method including functionalizing edges of particles of an anisotropic material, exfoliating the particles to form sheets of the material, aligning the sheets of material to form a network of multi-layered and aligned particles, and forming a structure out of the network of particles.

DETAILED DESCRIPTION OF THE EMBODIMENTS

Figure 1:
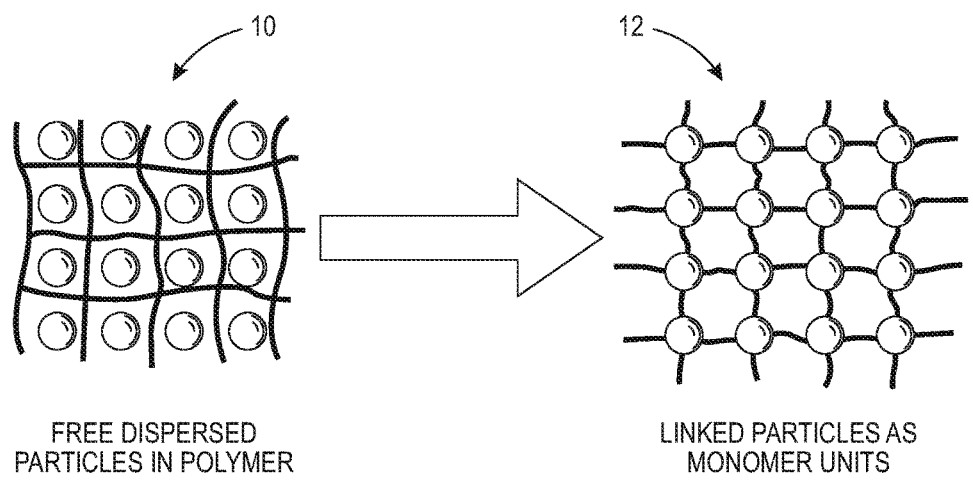
FIG. 1 shows the difference between the state of the art particle reinforced polymer composites and the disclosed chemically linked particles networks.

FIG. 1 shows the difference between current state of the art particle-reinforced composite materials consisting of randomly dispersed particles within a polymer matrix 10, without direct chemical linking between particles, and networks of chemically linked particles 12. In the case of an applied stress on direct impact, these particles 10 can move relatively freely together with the polymer parts exposed to stress. The mechanical robustness of such composite structures in generally larger than of the same particle-free polymer but the enhancement is limited. On the contrary, the chemically linked network of particles as shown at 12 in FIG. 1 have restricted movement in impact, therefore providing composite particle structures with increased toughness, elastic modulus and generally with enhanced structural integrity.

In the most general embodiment, the linked particles can have any shape including using random shape or isotropic (spherical) particles as illustrated in FIG. 1. In a further embodiment, the functionalized particles are anisotropic. In the embodiments here, the particles have functional groups selected in such a way that they can react only in one preferred way to produce aligned networks of linked particles. Generally, these particles will be referred to here as anisotropic particles. Anisotropic particles may include platy particles, such as graphene or clays. A platy particle typically has a flat and plate like shape oriented horizontally. Other anisotropic particles include fibers or rods.

Suitable platy anisotropic particles include: layered silicate clays, laponite, hydroxyapatite, alumina platelets and graphene and fibers and rods. Examples of suitable layered silicate include, a layered silicate of kaolinite group such as kaolinite, dickite, halloysite, chrysotile, lizardite, amesite; a layered silicate of smectite group such as montmorillonite, beidellite, nontronite, saponite, iron saponite, hectorite, sauconite, stevensite; a vermiculite group such as dioctahedral vermiculite, and trioctahedral vermiculite; a layered silicate of mica group such as muscovite, paragonite, phlogopite, biotie, and lepidolite; a layered silicate of brittle mica group such as margarite, clintonite, and anandite; a layered silicate of chlorite group such as cookeite, sudoite, clinochlore, chamosite, and nimite.

Figure 2:
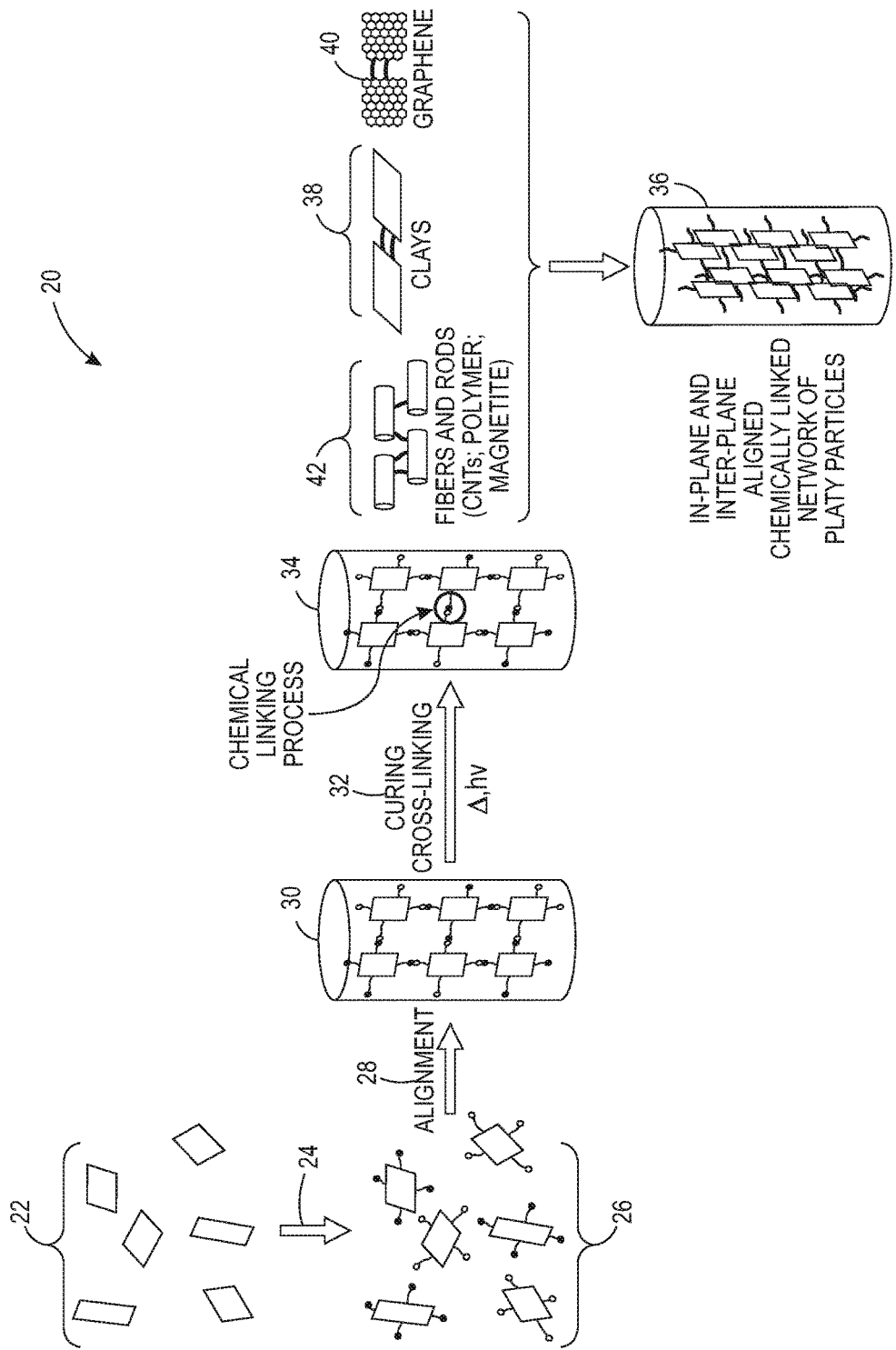
FIG. 2 shows an embodiment of a process for manufacturing a network of chemically linked anisotropic particles.

FIG. 2 shows an overall process and system 20 for creating robust, chemically linked particle networks. The basis of the system consists of reactive particles. In FIG. 2, the anisotropic particles 22 undergo activation at 22, in this case, edge functionalization. As will be discussed in more detail further, the edge functionalization may occur due to addition of the particles to some sort of fluid. The edge functionalization causes the particles to form edge functionalities shown at 26 which are used later in the process to produce in-plane chemical connections. In addition, a parallel alignment as show at 36 in FIG. 2 can be achieved by appropriate aligning means.

After the initial formation of the connecting points on the edge of the aggregated particles, these aggregates are exfoliated into at 28 into aligned, individual sheets of linked particles at 30. At 32 the linked particles are aligned inside a nozzle and then the chemical linking is induced, possibly using some external excitation to form a solid cured structure 34. The resulting chemically-linked particle network has in-plane an inter-sheet links of aligned particles shown at 36 that provide strength and flexibility nearing if not equal to that of prepreg carbon fibers, without the time-consuming and complex manufacturing process those require.

Figure 3:
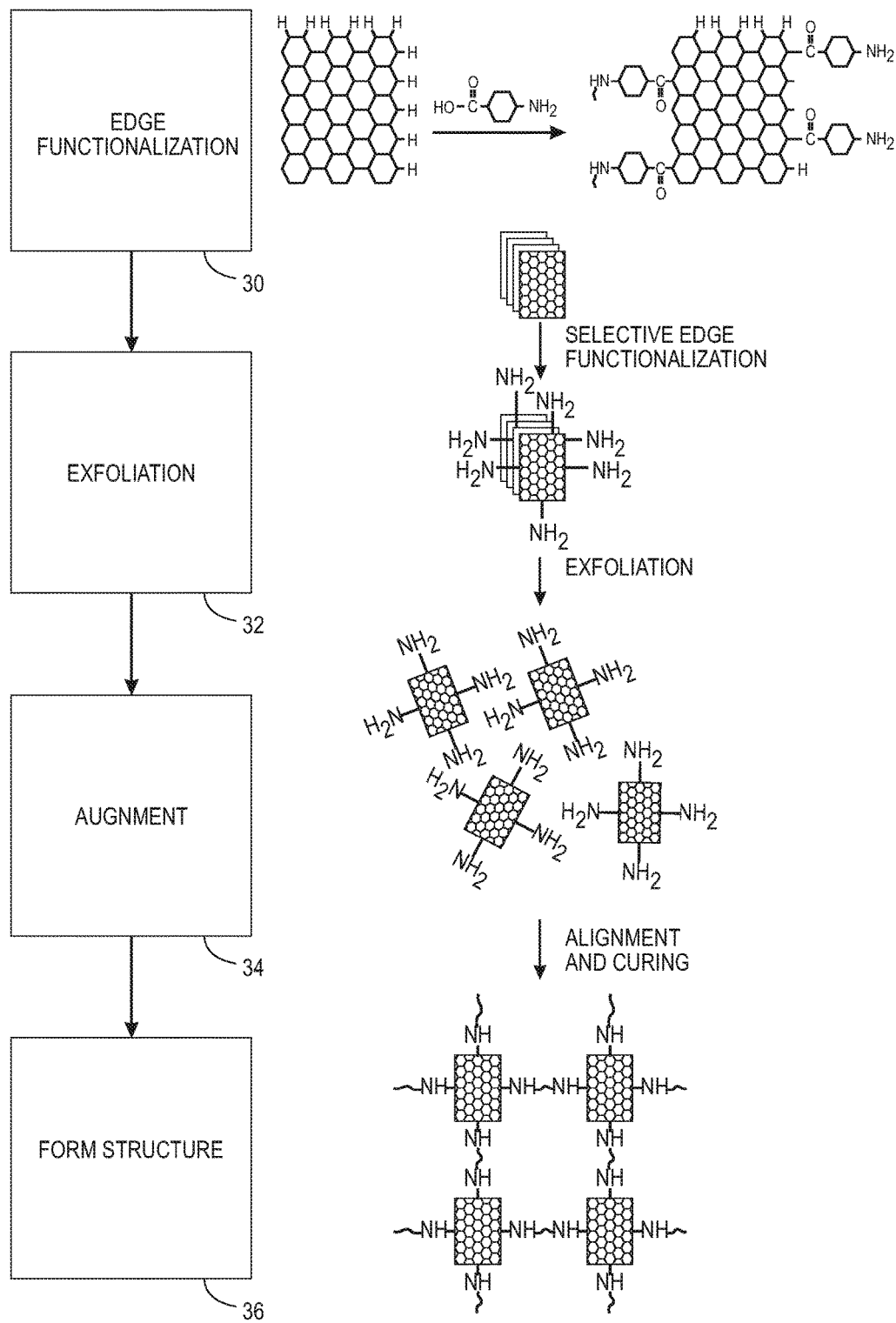
FIG. 3 shows an embodiment of a process for manufacturing a network of chemically-linked graphene particles.

In addition to being faster and simpler to manufacture, these particle networks are 'digitally compatible,' meaning that it is possible to dispense them from a system similar to a print head. The nozzle referred to above may be attached to a reservoir of these materials and assists with the alignment of the particles during dispensing. Having discussed the approach in general terms, the discussion now turns to specific embodiments of this process. As shown in FIG. 3, one embodiment uses graphene. The system uses inexpensive graphite powder mixed into 4-aminobenzoic acid ($H_2NC_6H_4CO_2H$) to cause edge functionalization at 50. The graphite particles then undergo exfoliation at 52, in one embodiment by undergoing sonication in an appropriate solvent. The presence of edge functional groups may facilitate the exfoliation. Exfoliation as used here generally means the process of turning three dimensional particle sheets into two dimensional sheets. This may be followed by condensation at 54, in this embodiment using an acrylate component.

In the next step the exfoliated amino functionalized graphene sheets are placed in the presence of an appropriate organic linking molecule, then they undergo alignment beyond that caused by the edge functionalization, condensation and exfoliation. This typically involves an aligning nozzle at 54. Examples of these are shown and discussed with regard to FIGS. 7 and 8. The nozzle will also dispense the aligned particles to form a desired structure which is cured at 58 by inducing a chemical reaction which links the particles through the organic linking molecules.

Figure 4:
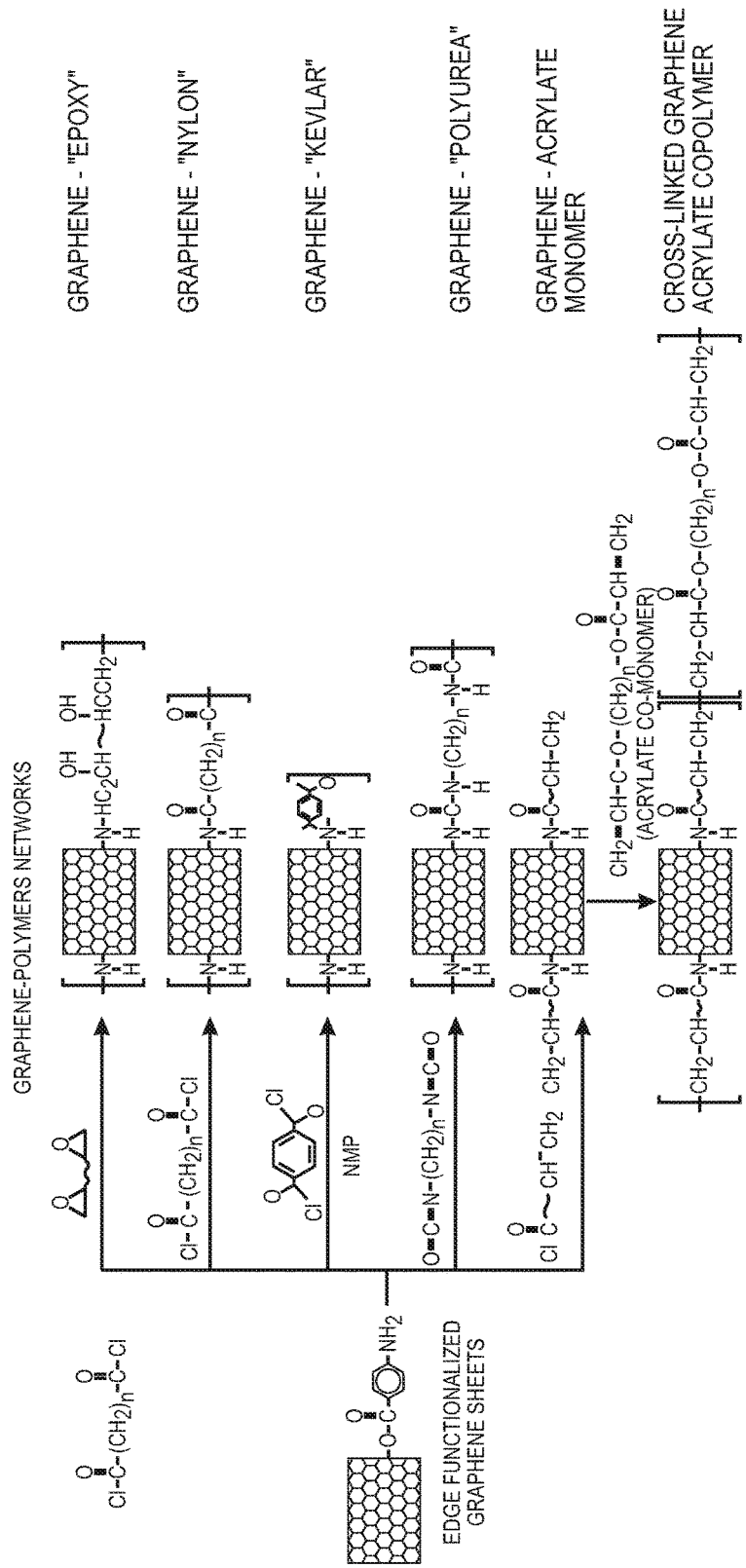
FIG. 4 shows graphene-polymer network composites which can be obtained by reacting amino functionalized graphene plates with various linking moieties.

Several materials embodiments are possible as a function of the type of chemical linkers between particles to produce a wide range of graphene reinforced chemically linked networked structures. In one embodiment the chemical linker is chosen such as to react directly with the amino functions through a condensation reaction. Typically these linkers contain two or more functional groups capable of reacting with amino groups. FIG. 4 illustrates schematically the type of chemical connectors as a function of the chemical linkers. By this process, several chemically linked graphene structures incorporating industrially relevant polymer linkers are obtained. These include: Graphene-Epoxy; Graphene-Nylon; Graphene Kevlar and Graphene-Polyurea. In another embodiment, the amino functional groups are reacted with a condensation reactive which contains vinyl groups. The intermediate vinyl functionalized graphene sheets are cross-linked by a vinyl polymerization reaction. The polymerization reaction may proceed directly by bonding of the vinyl groups present onto graphene edges. Alternatively, the vinyl functions present onto graphene edges may be co-polymerized with vinyl functional monomers and oligomers. This approach is advantageous because it enables the fabrication of networks with various degrees of flexibility in addition to mechanical strength simply changing the length of the reactive polymer chain.

Figure 5:
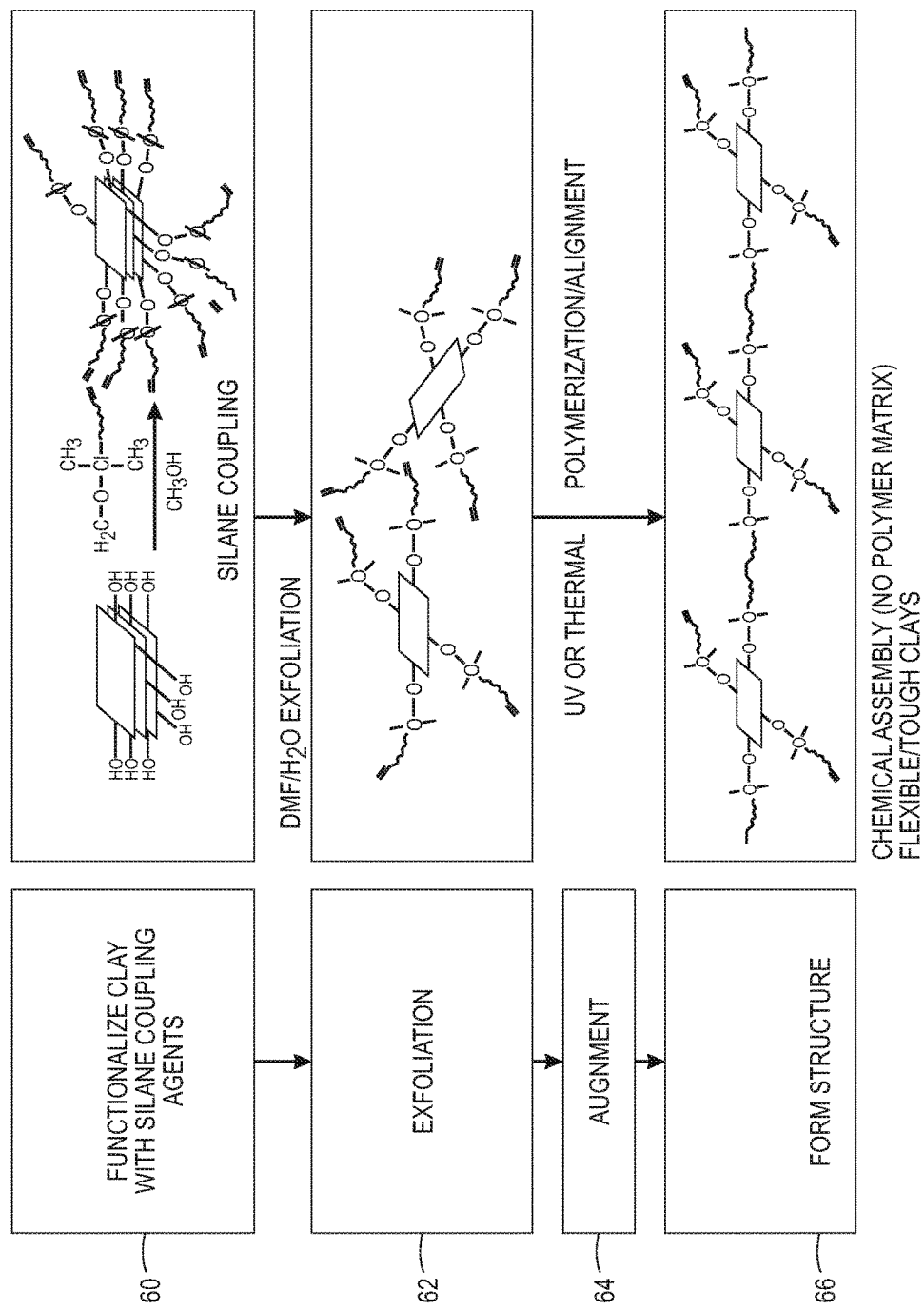
FIG. 5 shows an embodiment of a process for manufacturing a network of chemically-linked clay particles.

This example has discussed only graphene flakes. As another example of a platy particle, one could form chemically-linked particles out of clays shown in FIG. 5. The chemistry of clays differs significantly from the chemistry of graphene. Layered silicate particles typically possess reactive hydroxyl groups (—OH). The present invention takes advantage of these groups for the introduction of suitable chemical linkers. In one embodiment vinyl groups are introduced onto the edge of aggregated clay particles by reaction with silane coupling agents 60. Silane coupling agents connect to the particle edges through alkoxy groups. This embodiment uses mono-functional silane coupling reagents at 60.

Typically, the industry uses tri-functional silanes when particles such as clays or silica are being functionalized for dispersion in organic polymers. However, tri-functional silanes typically connect adjacent clay sheets preventing them from separating during exfoliation. Mono-alkoxy silanes have only one possible way of linking to clays preventing linking of adjacent clay sheets. The possibility of inter-particle linking is provided in this embodiment be the vinyl groups present in the chemical structure of the silane coupling agent. Suitable monofunctional silane agents incorporating polymerizable vinyl groups are known. For example methacryloxypropyldimethylethoxy silane and methacryloxypropyldimethylmethoxy silane coupling agents are commercially available at Gelest Inc., Morrisville, Pa.

The functionalized clay sheets are exfoliated in DMF (dimethylformamide) and water mixtures at 62. This will then result in individual sheets of clay which can then be linked in a controlled manner. This may occur in clay-to-clay or clay-to-polymer. This provides enhanced mechanical and gas permeability properties. The chemically-linked sheets then align in the nozzle as discussed above at 64. The structures can then be formed at 66.

Figure 6:
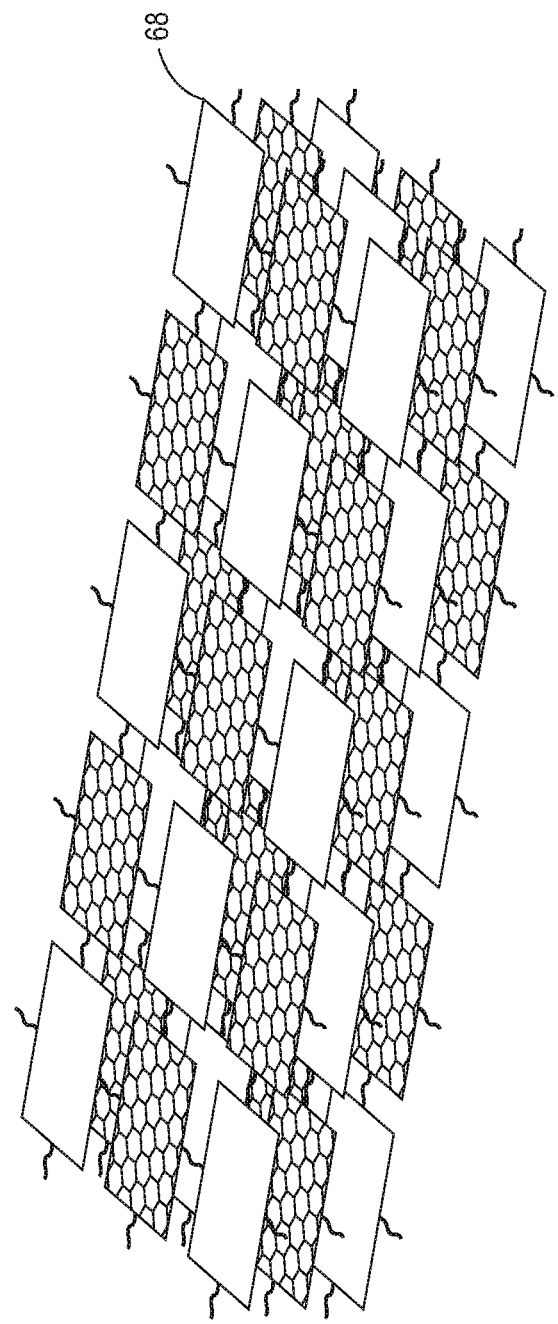
FIG. 6 shows an embodiment of multi-particles chemically linked networks.

A further embodiment provides chemically linked networks consisting of intercalated different particles at 68 in FIG. 6. Such structures may possess multiple properties provided by the different types of constituent particles. These novel architected structures are very difficult to achieve with present technologies. As an example a mixed structure containing graphene and hydroxyapatite linked particles may provide mechanically strong structures (a graphene property) which have excellent gas barrier performance (a hydroxyapatite property) at the same time.

Once particles are appropriately functionalized with reactive groups which will react with chemical linkers described before they are used for the aligning/deposition and final curing steps. A typical formulation for this purpose consists of functionalized particles dispersed in a mixture containing a solvent a linking multifunctional component and a curing initiator. A solvent is optionally needed in order to achieve workable viscosities for these formulations. The linking material is chosen to be reactive under appropriate activating reaction conditions with the functional groups present onto the surface or the edge of the particles.

For example as illustrated in FIG. 4, epoxy linker precursors create cured epoxy particle composites, acyl chlorides produce cured Kevlar or Nylon like particle networks, while isocyanates produce polyurea linked particles networks. These condensation reactions typically require an acid or a base catalyst. Radical polymerization of vinyl groups present onto the particles produce vinyl groups linked particles networks. Radical polymerization required a radical initiator. Useful thermal initiators are those which produce initiating radicals by heating. Suitable examples include benzoyl peroxide or azobisisobutyronitrile and their functional derivatives. Also preferred are photoinitiators which produce radicals when activated by a specific wavelength light, most often UltraViolet light. Examples include Type I photoinitiators such as benzoin ethers, benzyl ketals, α-dialkoxyacetophenones, α-hydroxyalkylphenones, α-aminoalkylphenones and acylphosphine oxides and Type II photoinitiators such as benxzophenones and thioxanthones in combination with amine synergists.

Figure 7:
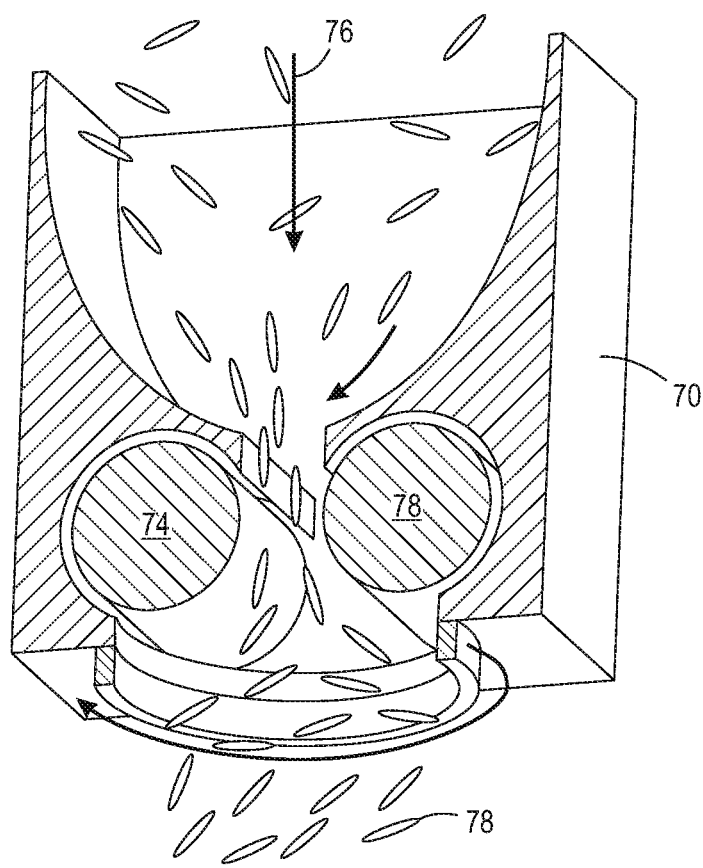
FIGS. 7-9 show embodiments of nozzles that produce aligned networks of particles.
Figure 8:
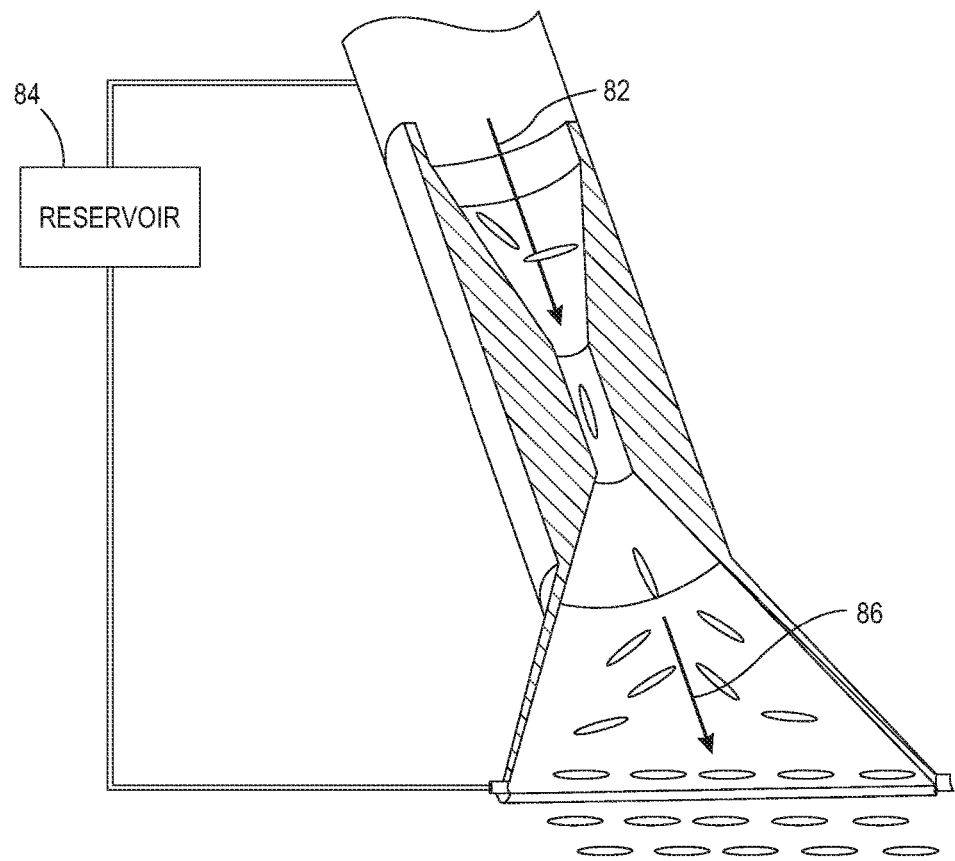

The particles alignment may take many forms. As an example, when the alignment is induced in a nozzle, the nozzle may be one of those disclosed in U.S. patent application Ser. No. 14/578,071. FIGS. 7 and 8 disclose embodiments of aligning nozzles. In FIG. 7, an example of a nozzle 70 with a two-roll mill. The rollers 74 and 78 rotate in opposite directions. A fluid enters the nozzle 70 in the direction of 76 and goes through the two-roll mill. The particles such as 78 exit the nozzle in an aligned fashion.

FIG. 8 shows another example of an aligning nozzle 70. In this example, the fluid, such as from a reservoir 84, enters the nozzle 70 in the direction of the arrow 82. The fluid enters the narrowing portion of the nozzle and exits the nozzle in the direction of an aligning flow 86. The contracting portion of the nozzle causes the linked particles to exit the nozzle in an aligned fashion.

Figure 9:
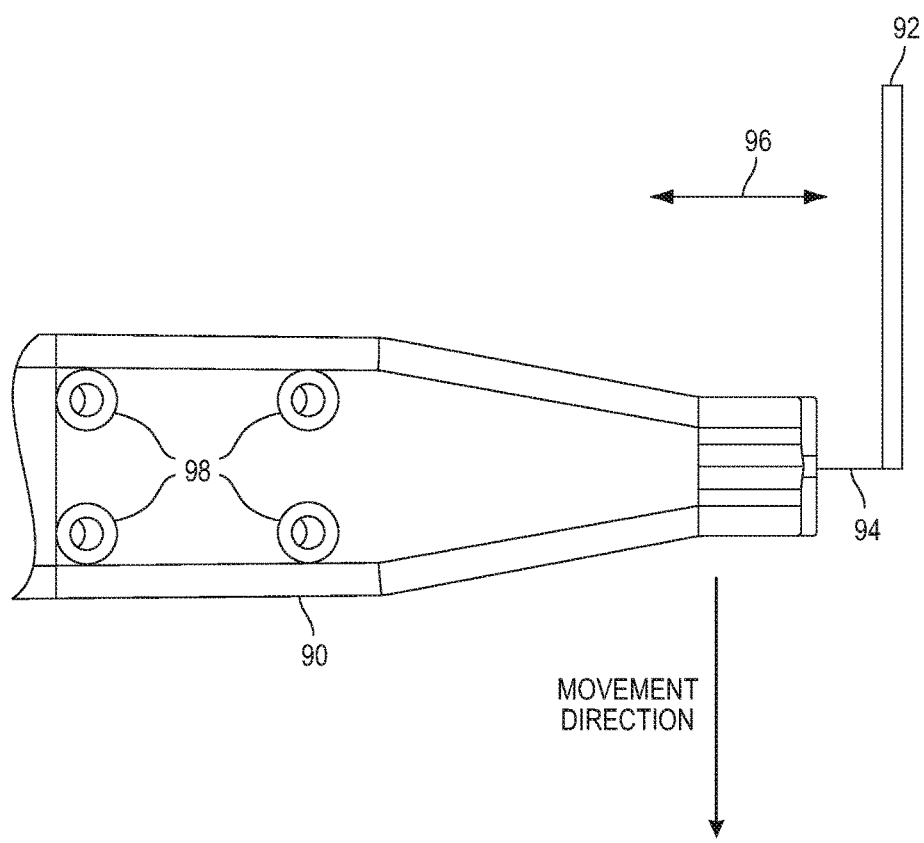

FIG. 9 shows an example of a nozzle that employs a 4-roll mill as described in U.S. patent application Ser. No. 14/578,044, filed Dec. 19, 2014. The nozzle 90 has an internal 4-roll mill 98. As the rollers spin, they cause the particles in the fluid to align such that when they exit the nozzle as stream 94, they are aligned in the direction of arrow 96. The material 92 is formed form the stream as the nozzle moves in the direction shown.

In another method, shear-induced in-plane aligned anisotropic particles structures is created by using a doctor blade coating technique simply using commercial film applicators.

Formulations consisting of high concentration particles dispersed in a solvent, as required for deposition in the present invention have high viscosity—in the order of 1,000 Pa·s to 100,000 Pa·s. In order for these compositions to be deposited through a nozzle or to be coated with an applicator these formulations display the property of significant decrease of viscosity at high shear. In other words these formulations display thixotropic behavior prior to curing. High shear is achieved when jetting through the nozzles or when the formulation is coated at high speed. Suitable formulations will display a viscosity reduction to a range comprised from 1 to 10 Pa·s at a shear rate comprised from 10 to 100 s$^{-1}$.

In this manner, a chemically-linked network of aligned particles is created. The network or particles can form particle polymer composite materials that have mechanical properties approaching those of prepreg carbon fibers. However, they are far easier and less time-consuming to manufacture than prepreg carbon fibers.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   functionalizing edges of particles of an anisotropic material;
   exfoliating the particles to form sheets of the material;
   aligning the sheets of material to form a network of multi-layered and aligned particles; and
   forming a structure out of the network of particles.

2. The method of claim 1, wherein the anisotropic material comprises graphene.

3. The method of claim 2, wherein the functionalized graphene edge is created by condensation of 4-aminobenzoic acid with graphite powder to produce amino-functionalized graphene particles.

4. The method of claim 3, wherein the amino-functionalized graphene particles are coupled with a reactive acrylate to produce vinyl edge functionalized graphene particles.

5. The method of claim 1, wherein exfoliating the particles comprising sonication of the particles in a solvent.

6. The method in claim 5 wherein the solvent is selected form a group consisting of N-methyl-2-pyrrolidone, N,N-dimethylacetamide, dimethylformamide and dimethyl methylphosphonate.

7. The method of claim 1, wherein aligning the sheets comprises aligning the particles inside a nozzle of a dispensing device.

8. The method of claim 7, wherein the aligning the sheets further comprises applying an external excitation to the particles upon exit of the nozzle for the creation of permanent chemical linkages between the particles by reacting the chemical functions of the organic linker with the reactive functions onto the edge of the functional particles.

9. The method of claim 8, wherein the external excitation comprises a pulsed ultraviolet light emitting diode and wherein the reactive functions onto the particles are vinyl groups.

10. The method of claim 8, wherein the external excitation comprises heat, the reactive functions of the edge functionalized particles are amino groups and the reactive organic linkers are selected form ma group consisting of difunctional epoxies, acyl chlorides, isocyanates.

11. The method of claim 1, wherein the anisotropic material comprises layered silicate clay.

12. The method of claim 11, wherein functionalizing the edges comprises reacting the layered silicate clay with a mono-alkoxy silane coupling agent.

13. The method of claim 11, wherein exfoliating of the particles comprises exfoliating the particles in dimethylformamide and water.

* * * * *